United States Patent
Kobayashi et al.

(10) Patent No.: US 6,430,027 B1
(45) Date of Patent: Aug. 6, 2002

(54) PULSE GENERATING CAPACITOR

(75) Inventors: Shinichi Kobayashi, Izumo; Yuko Ihara; Shuji Watanabe, both of Shimane-ken; Yoshitaka Kageyama, Izumo; Akira Nagai, Kyotanabe, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/961,913

(22) Filed: Sep. 24, 2001

(30) Foreign Application Priority Data

Oct. 6, 2000 (JP) .......................................... 2000-307086

(51) Int. Cl.[7] .............................................. H01G 4/228
(52) U.S. Cl. .................................. 361/306.1; 361/308.1
(58) Field of Search ........................... 360/306.1, 308.1, 360/309, 311, 312, 321.1, 322, 329, 330, 303

(56) References Cited

FOREIGN PATENT DOCUMENTS

| JP | 63-136612 | | 6/1988 |
|----|-----------|---|--------|
| JP | 2-177412 | | 7/1990 |
| JP | 11-274000 | | 8/1999 |
| JP | 11297563 | * | 10/1999 |

* cited by examiner

Primary Examiner—Anthony Dinkins
(74) Attorney, Agent, or Firm—Ostrolenk, Faber, Gerb & Soffen, LLP

(57) ABSTRACT

A pulse generating capacitor is provided in which a capacitor element has electrodes provided on the front and rear faces thereof, and lead terminals connected to the electrodes by means of bonding members. The bonding members can contain Ag as a major component with a $ZrO_2$ powder added thereto at a content of about 20% to 60% by volume. The capacitor solves a problem of crack generation on the capacitor element in response to thermal cycling, while maintaining the effects of preventing its pulse voltage from being decreased and enhancing the bonding strength of its lead terminals.

17 Claims, 1 Drawing Sheet

PULSE GENERATING CAPACITOR

BACKGROUND OF THE INVENTION

1. Field of the Invention

The present invention relates to a pulse generating capacitor, for example, a pulse generating capacitor that is incorporated into a high intensity discharge (HID) lamp.

2. Description of the Related Art

In pulse generating capacitors that are used for generating high-voltage starting pulses for HID lamps, electrodes and lead terminals of the capacitors are conventionally bonded together with bonding members composed of Ag-containing a low-melting-point glass material. When the glass content of the bonding members is excessively high, the glass component diffuses into the grain boundaries of the capacitor element (ceramic board) during baking, resulting in a decrease in the pulse voltage of the capacitor. Furthermore, when the capacitor is used at a high temperature, the diffusion advances with the passage of time, resulting in a further lowering of the pulse voltage, as well as a lowering of the impact resistance of the capacitor element. On the other hand, when the glass component content is too low, the strength of the bonding members is essentially insufficient, causing problems such as lowered bonding strength.

As a countermeasure, Japanese Unexamined Patent Application Publication No. 2-177412 teaches that a bonding member having little effect on the pulse voltage and having an adequate strength can be selected by limiting the content of a glass component in the bonding member to the range of 39% to 69% by weight. Furthermore, Japanese Unexamined Patent Application Publication No. 63-136612 discloses an insulating layer provided between the bonding members and the electrodes for preventing diffusion. However, even when such measures are adopted, lowering of the pulse voltage will occur to some extent as long as a glass material is employed.

Accordingly, Japanese Unexamined Patent Application Publication No. 11-274000 proposes the use of an alloy which does not include a glass material for the bonding member, so as to prevent the pulse voltage from decreasing due to diffusion of the glass material and to enhance the bonding strength. However, it was found that the use of such a bonding member caused cracks on a capacitor element due to shrinkage-caused stresses of the bonding member in a thermal cycle test, resulting in breakage of the capacitor element.

SUMMARY OF THE INVENTION

Based on considerations on the problems described above, one of the objects of the present invention is to provide a pulse generating capacitor that can alleviate the problem of crack generation on the capacitor element as a result of temperature changes, as encountered for instance during a thermal cycle test, while maintaining the effects of preventing the pulse voltage from decreasing and enhancing the bonding strength of the lead terminals.

To achieve the above-described object, a pulse generating capacitor according to the present invention comprises a plate capacitor element, electrodes both on the front and rear faces of the capacitor element, and lead terminals connected to the electrodes by means of bonding members, wherein the bonding members comprise a metal as a major component with a ceramic powder added thereto. The ceramic powder is preferably zirconium oxide. It is also preferable that the content of the ceramic powder is in the range of about 20% to 60% by volume.

In the pulse generating capacitor according to the present invention, the bonding members comprising metal as a major component with a ceramic powder added thereto are used. Accordingly, the linear thermal expansion coefficient of the bonding members is close to that of a capacitor element comprising a ceramic as a major component, resulting in a smaller thermal stress in a thermal cycle test and a smaller thermal conductivity of the bonding members, as well as a smaller temperature distribution of the product (capacitor). Furthermore, since no glass material is added or only a small amount of a glass material is added, there is no decrease in the pulse voltage or in the bonding strength.

Other objects, advantages, and novel features of the invention will become more apparent from the following detailed description when taken in conjunction with the accompanying drawings.

DESCRIPTION OF THE PREFERRED EMBODIMENT

The following are explanations of an embodiment of a pulse generating capacitor according to the present invention with reference to the attached figures.

Although the present invention will be described with reference to the following figures, it is to be understood that the invention is not limited to the precise embodiment described below, and various changes and modifications may be made to various usages and conditions without departing from the spirit and scope of the invention as described in the claims that follow.

Figure 1:
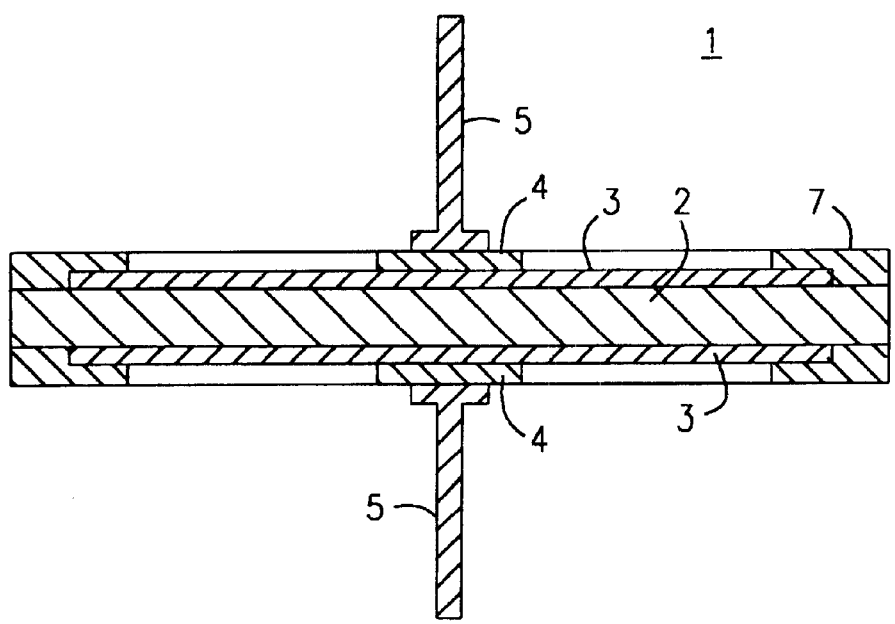
FIG. 1 is a cross-sectional view showing one embodiment of a pulse generating capacitor according to the present invention.

FIG. 1 shows a pulse generating capacitor 1 as an embodiment of the present invention. The capacitor 1 comprises a disc type capacitor element 2 composed of a ceramic, electrodes 3 provided on the front and rear faces of the capacitor, lead terminals 5 that are connected to the electrodes 3 by means of bonding members 4 and insulating layers 7 formed in shapes of rings on the peripheral areas of the electrodes 3.

The electrodes 3 are formed by applying a paste comprising Ag as a major element to the capacitor element 2, followed by baking. The bonding members 4 are made of a paste formed by mixing an Ag powder, a $ZrO_2$ powder, a binder and a solvent. The paste is applied to the electrodes 3 and is baked with the lead terminals 5 connected therewith.

Regarding the bonding members 4, ten different formulations with Ag/$ZrO_2$ volume ratios of 1/9, 2/8, 3/7, 4/6, 5/5, 6/4, 7/3, 8/2, 9/1 and 10/0 were prepared. Ten different samples were prepared accordingly, and were subjected to a thermal cycle test so as to measure the terminal pulling strength (in N units) and pulse voltage (in kV units). The samples employed for the measurements had capacitor elements 1 made of a barium titanate type ceramic, and the dimensions were 18 mm for the diameter and 0.7 mm for the thickness. The electrodes 3 comprising Ag as a major element had a diameter of 16 mm, and the lead terminals 5 were made of Ni. The electrodes 3 were baked at 830° C. and the bonding members 4 were baked at 600° C.

Figure 2:
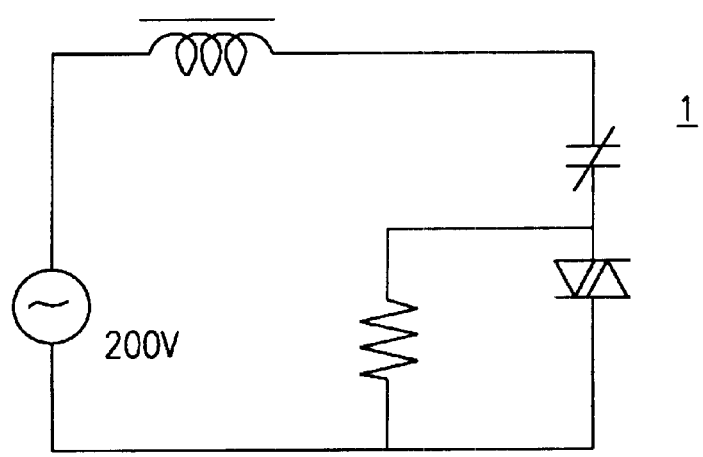
FIG. 2 is a block diagram showing a circuit for testing properties of a pulse generating capacitor.

The initial properties were measured for each sample using the test circuit shown in FIG. 2. Properties after a thermal cycle test, in which thermal cycling between −40° C. and 125° C. was repeated 100 times, were also measured. The results are shown in Table 1.

TABLE

| Ag/ZrO$_2$ | Initial strength (N) | Initial pulse voltage (kV) | Strength after 100 cycles (N) | Pulse voltage after 100 cycles (kV) |
|---|---|---|---|---|
| 1/9  | 36 | 0.5 | 37 | 0.5 |
| 2/8  | 38 | 1.0 | 39 | 0.9 |
| 3/7  | 38 | 1.3 | 36 | 1.4 |
| 4/6  | 41 | 1.9 | 42 | 1.9 |
| 5/5  | 39 | 2.0 | 39 | 2.0 |
| 6/4  | 39 | 1.9 | 38 | 2.0 |
| 7/3  | 40 | 2.1 | 40 | 2.1 |
| 8/2  | 38 | 2.1 | 37 | 2.0 |
| 9/1  | 36 | 1.9 | 8  | 0.5 |
| 10/0 | 36 | 2.0 | 10 | 0.6 |

As is evident from Table 1, good properties were shown for the samples using bonding members having ZrO$_2$ at contents of about 20% to 60% by volume. When the ZrO$_2$ content was less than 10% by volume, cracks appeared on the capacitor elements in the thermal cycle test, and both the pulse voltage and the pulling strength were decreased. Furthermore, when the ZrO$_2$ content was more than 70% by volume, the initial pulse voltages were decreased.

The above-described bonding members 4 contained Ag as a major component. Besides Ag, metals such as Ni, Al, Cu, Au, Pd, Pt, etc. may be used.

When a noble metal is used as a major component, baking may be carried out in air. When a base metal is used as a major component, it is preferably carried out in a neutral atmosphere or in a reducing atmosphere. For the ceramic powder acting as an additive, ceramics such as Al$_2$O$_3$, forsterite, steatite and cordierite can be used in addition to ZrO$_2$. However, since ZrO$_2$ is less reactive, it produces fewer problems caused by reactions with materials contained in the capacitor elements 1 and electrodes 3 compared to the other ceramics. Accordingly, it is preferable as the additive.

A small amount of a glass material may be added to the bonding members. Table 2 below shows the results of the measurement of the initial pulse voltages of the samples that were prepared using seven different bonding members wherein a glass material was added to Ag and ZrO$_2$ at contents of from 0% to 25% by volume. As the glass material, a lead borosilicate glass was used.

TABLE 2

| Ag (vol. %) | ZrO$_2$ (vol. %) | Glass content (vol. %) | Initial pulse voltage (kV$_{p-p}$) |
|---|---|---|---|
| 50 | 50.00 | 0     | 2.0 |
| 50 | 49.75 | 0.25  | 1.9 |
| 50 | 48.75 | 1.25  | 1.5 |
| 50 | 47.50 | 2.50  | 1.0 |
| 50 | 45.00 | 5.00  | 0.7 |
| 50 | 37.50 | 12.50 | 0.3 |
| 50 | 25.00 | 25.00 | 0.3 |

Addition of a glass material can accelerate sintering of the bonding member. However, when the content is more than about 1.0% by volume, the glass diffuses into the capacitor element, resulting in a lowered pulse voltage. Furthermore, when it is less than about 0.1% by volume, there is virtually no sintering acceleration effect, although the pulse voltage is not affected.

As is evident from the explanations described above, according to the present invention, the lead terminals are connected to the electrodes with bonding members comprising a metal as a major component with a ceramic powder added thereto. Accordingly, it is possible not only to prevent the pulse voltage and the bonding strength from being reduced but also to effectively prevent generation of cracks on the capacitor element during thermal cycle testing.

What is claimed is:

1. A pulse generating capacitor comprising:
   a plate capacitor element having front and rear faces;
   an electrode on both the front and rear faces of said capacitor element; and
   a lead terminal connected to each of said electrodes by means of a bonding member,
   wherein said bonding member comprises metal in combination with a ceramic powder.

2. A pulse generating capacitor according to claim 1, wherein the content of said ceramic powder in said bonding member is in the range of about 20% to 60% by volume.

3. A pulse generating capacitor according to claim 2, wherein said bonding member comprises between about 0.1 to 1.0 % by volume glass.

4. A pulse generating capacitor according to claim 3, wherein the plate capacitor element comprises ceramic.

5. A pulse generating capacitor according to claim 4, wherein said glass comprises lead borosilicate.

6. A pulse generating capacitor according to claim 5, wherein said metal is selected from the group consisting of Ag, Ni, Al, Cu, Au, Pd and Pt.

7. A pulse generating capacitor according to claim 6, wherein said ceramic is selected from the group consisting of Al$_2$O$_3$, forsterite, steatite, cordierite and ZrO$_2$.

8. A pulse generating capacitor according to claim 7, wherein said ceramic powder is zirconium oxide.

9. A pulse generating capacitor according to claim 8, wherein said metal is Ag.

10. A pulse generating capacitor according to claim 1, wherein said metal is selected from the group consisting of Ag, Ni, Al, Cu, Au, Pd and Pt.

11. A pulse generating capacitor according to claim 10, wherein said ceramic is selected from the group consisting of Al$_2$O$_3$, forsterite, steatite, cordierite and ZrO$_2$.

12. A pulse generating capacitor according to claim 11, wherein said ceramic powder is zirconium oxide.

13. A pulse generating capacitor according to claim 12, wherein said metal is Ag.

14. A pulse generating capacitor according to claim 1, wherein said ceramic powder is zirconium oxide.

15. A pulse generating capacitor according to claim 14, wherein the content of said ceramic powder in said bonding member is in the range of about 20% to 60% by volume.

16. A pulse generating capacitor according to claim 15, wherein the plate capacitor element comprises ceramic.

17. A pulse generating capacitor according to claim 16, wherein the plate capacitor element ceramic is a barium titanate system.

* * * * *